United States Patent
Jin et al.

(10) Patent No.: US 12,380,336 B1
(45) Date of Patent: Aug. 5, 2025

(54) ROAD TRAFFIC INCIDENT DETECTION METHOD, SYSTEM AND DEVICE BASED ON SMALL SAMPLE LEARNING

(71) Applicant: ZHEJIANG UNIVERSITY, Hangzhou (CN)

(72) Inventors: Sheng Jin, Hangzhou (CN); Congcong Bai, Hangzhou (CN); Jun Jing, Hangzhou (CN); Yang Jiang, Hangzhou (CN); Wentong Guo, Hangzhou (CN); Mengtao Zhou, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 0 days.

(21) Appl. No.: 19/176,159

(22) Filed: Apr. 11, 2025

(30) Foreign Application Priority Data

Jun. 7, 2024 (CN) .......................... 202410734145.8

(51) Int. Cl.
G06N 3/00 (2023.01)
G06N 3/0442 (2023.01)
G06N 3/045 (2023.01)
G06N 3/09 (2023.01)
G08G 1/01 (2006.01)

(52) U.S. Cl.
CPC .............. *G06N 3/09* (2023.01); *G06N 3/0442* (2023.01); *G06N 3/045* (2023.01); *G08G 1/0133* (2013.01)

(58) Field of Classification Search
CPC ........ G06N 3/09; G06N 3/045; G06N 3/0442; G08G 1/0133

USPC ........................................................ 701/117
See application file for complete search history.

(56) References Cited

FOREIGN PATENT DOCUMENTS

| CN | 109284705 A | 1/2019 | |
|---|---|---|---|
| CN | 112487961 A | * 3/2021 | ............. G06N 3/048 |
| CN | 112861975 A | * 5/2021 | ............. G06V 10/82 |
| CN | 112990545 A | 6/2021 | |
| CN | 115082868 A | 9/2022 | |
| CN | 116109857 A | 5/2023 | |
| CN | 116628500 A | 8/2023 | |

(Continued)

OTHER PUBLICATIONS

Jin Sheng et al., "The use of street-view images in urban traffic studies: review, analysis, and outlook", Journal of Transportation Engineering and Information, Apr. 7, 2024, pp. 191-209.

(Continued)

*Primary Examiner* — Tiffany P Young

(57) ABSTRACT

Provided are a road traffic incident detection method, system and device based on small sample learning. According to the invention, traffic flow data and incident data are utilized to construct non-incident samples by a case contrast study method, traffic flow feature indexes are extracted to construct incident and non-incident sample feature sets, then sample division and pairing are performed on the feature sets to obtain training and test sample pair sets, a traffic incident detection model is constructed by adopting a twin network architecture in small sample learning, and the model is trained and tested by a sample pair mode. The invention is conductive to accurately detecting accidental traffic incidents, and providing supports for avoiding secondary accidents and improving the traffic safety level.

8 Claims, 6 Drawing Sheets

(56) References Cited

FOREIGN PATENT DOCUMENTS

| | | |
|---|---|---|
| CN | 116645563 A | 8/2023 |
| CN | 117037081 A | 11/2023 |
| CN | 117275220 A | 12/2023 |
| CN | 118057354 A | 5/2024 |
| WO | 2015170289 A1 | 11/2015 |

OTHER PUBLICATIONS

Guo W, et al., "Fusion of satellite and street view data for urban traffic accident hotspot identification", International Journal of Applied Earth Observation and Geoinformation, Apr. 30, 2024, pp. 1-15.

Wang D, et al., "Real-time traffic event detection from social media", ACM Transactions on Internet Technology, Nov. 30, 2017, pp. 1-23.

* cited by examiner

ROAD TRAFFIC INCIDENT DETECTION METHOD, SYSTEM AND DEVICE BASED ON SMALL SAMPLE LEARNING

CROSS REFERENCE TO RELATED APPLICATIONS

This application claims foreign priority of Chinese Patent Application No. 202410734145.8, filed on Jun. 7, 2024 in the China National Intellectual Property Administration, the disclosures of all of which are hereby incorporated by reference.

TECHNICAL FIELD

The present invention belongs to the technical field of road traffic safety study, relates to a road traffic incident detection method, system and device, and particularly relates to a road traffic incident detection method, system and device based on small sample learning.

BACKGROUND OF THE PRESENT INVENTION

The occurrence of traffic incidents may be monitored and identified in real time by collecting and analyzing traffic flow data, comprising vehicle speed, density, flow and other information, through a traffic incident detection technology. Meanwhile, the development of machine learning and data analysis technology also provides strong support for traffic incident detection by utilizing the traffic flow data. An accurate traffic incident detection model may be trained by analyzing and modeling a mass of historical data. These models can identify abnormal situations inconsistent with normal traffic flow patterns, and give an alarm or take corresponding measures in time. The real-time detection of traffic incidents may assist traffic management departments in better understanding and dealing with the traffic incidents, thus improving traffic operation efficiency and safety. Meanwhile, this technology also provides important support for the development of intelligent transportation system.

Traditional incident detection technology is mainly implemented by manually setting thresholds according to changes of traffic flow parameters of upstream and downstream detectors, and the threshold setting is often too subjective and has a low incident identification rate. With the development of big data and artificial intelligence technology, there have been many technologies for detecting the traffic incidents by deep learning in recent years. However, most methods have the following two problems: 1. a number of incident samples is far less than that of non-incident samples, leading to the model being insensitive to a few of samples and a high missing report rate; and 2. a total number of samples is limited, and the training is easy to fall into over-fitting, leading to insufficient generalization ability of the model.

SUMMARY OF THE PRESENT INVENTION

Aiming at the above problems, the present invention provides a road traffic incident detection method, system and device based on small sample learning, and the present invention is conductive to accurately detecting accidental traffic incidents, and providing supports for avoiding secondary accidents and improving the traffic safety level.

The technical solutions adopted in the present invention are as follows.

A road traffic incident detection method based on small sample learning comprises the following steps:

S1: collecting traffic incident samples, and extracting non-incident samples by a case contrast study method to obtain original data;

S2: calculating traffic flow data according to the original data, extracting traffic flow space-time state features to obtain an incident sample feature set and a non-incident sample feature set, and respectively dividing the incident sample feature set and the non-incident sample feature set into a training set and a test set to obtain a training sample set and a test sample set;

S3: pairing samples in the training sample set to obtain sample pairs, and assigning a label to each sample pair to obtain a training sample pair set;

S4: constructing a traffic incident detection model by adopting a twin network architecture in small sample learning, and training the traffic incident detection model by utilizing the training sample pair set;

S5: pairing samples in the test sample set to obtain a test sample pair set, and evaluating a performance of the trained traffic incident detection model by using the test sample pair set; and S6: detecting traffic incidents by utilizing the trained traffic incident detection model.

Further, traffic incident sample data contain traffic incident occurrence location and time; and the non-incident samples need to meet the following conditions:

a. the non-incident samples and the incident samples come from a same traffic detector, and are collected from a same time period;

b. when an incident occurs on a working day, the non-incident samples are extracted from all other working days in the same month except the day when the incident occurs; and when the incident occurs on a non-working day, the non-incident samples are extracted from all other non-working days in the same month except the day when the incident occurs; and c. time of the extracted non-incident samples is 0.5 hour before occurrence time of any incident sample, or 0.5 hours after end of an incident duration.

Further, in the step S1, detectors corresponding to the incident samples and the non-incident samples are upstream and downstream detectors in the nearest occurrence locations the original data extracted by the detector contain:

a total number N of vehicles passing through the detector within a certain time period T;

a speed v of each vehicle at the detector within the certain time period T; and time $t_i$ taken by each vehicle to pass through the detector within the certain time period T.

Further, in the step S2, the traffic flow data comprise a flow, a speed and an occupancy; the traffic flow space-time state features comprise time series data of upstream flow, speed and occupancy, time series data of downstream flow, speed and occupancy, and time series data of differences of upstream and downstream flows, speeds and occupancies.

Further, in the step S3, the respectively dividing the incident sample feature set and the non-incident sample feature set into the training set and the test set to obtain the training sample set and the test sample set, specifically comprises:

performing standard deviation Z-score standardization processing on the incident sample feature set and the non-incident sample feature set, randomly selecting a certain proportion of samples from the incident sample feature set as the incident sample training set, taking the remaining samples as the incident sample test set, randomly selecting the same proportion of samples from the non-incident sample feature set as the non-incident sample training set, and taking the remaining samples as the non-incident sample test set; and down-sampling the non-incident sample training set, combining the incident sample training set and the down-sampled non-incident sample training set into the training sample set, and combining the incident sample test set and the non-incident sample test set into the test sample set. Further, the down-sampling the non-incident sample training set, specifically comprises:

clustering the non-incident sample training set by a K-shape time series clustering method to obtain $n_{cs}$ clusters, and according to a number $N_{ET}$ of samples in the incident sample training set, randomly selecting $N_{ET}/n_{cs}$ representative samples from each cluster to obtain the down-sampled non-incident sample training set.

Further, in the step S3, the pairing the samples in the training sample set to obtain the sample pairs, and assigning the label to each sample pair, specifically comprises:

pairing each sample in the training sample set with all other samples in the training sample set except the sample to obtain several sample pairs; when two samples in the sample pair both belong to the incident samples or the non-incident samples, assigning a positive label; and when two samples in the sample pair respectively belong to the incident sample and the non-incident sample, assigning a negative label.

Further, in the step S4, a structure of the two sub-networks in the twin network architecture is long and short-term memory network LSTM—attention mechanism—full connection layer FC the two sub-networks share same weight and parameters; and a loss function adopted in a trained model is a contrast loss function.

The step S5 specifically comprises: respectively pairing the samples in the test sample set with the samples in the training sample set one by one to obtain the test sample pair set; and inputting test sample pairs into the trained traffic detection model, outputting a distance between two samples by the model, and for a minimum distance output after pairing a certain sample in the test sample set with all samples in the training sample set, classifying the test sample into the same category as the paired sample of the minimum distance, and then evaluating the performance of the traffic incident detection model.

A road traffic incident detection system based on small sample learning comprises:

a data collecting module configured for collecting traffic incident samples, and extracting non-incident samples by a case contrast study method to obtain original data;

a feature collecting module configured for calculating traffic flow data according to the original data, extracting traffic flow space-time state features to obtain an incident sample feature set and a non-incident sample feature set, and respectively dividing the incident sample feature set and the non-incident sample feature set into a training set and a test set to obtain a training sample set and a test sample set;

a training sample pairing module configured for pairing samples in the training sample set to obtain sample pairs, and assigning a label to each sample pair to obtain a training sample pair set;

a model training module configured for constructing and training a traffic incident detection model by adopting a twin network architecture in small sample learning, and training the model by utilizing the training sample pair set;

a performance evaluating module configured for pairing samples in the test sample set to obtain a test sample pair set, and evaluating a performance of the trained traffic incident detection model by using the test sample pair set; and an incident detecting module configured for detecting traffic incidents by utilizing the trained traffic incident detection model.

A computer device comprises:

one or more processors; and a memory for storing one or more programs;

wherein, when the one or more programs are executed by the one or more processors, the one or more processors implement the method for evaluating a tunnel driving risk level based on vehicle bus data above.

The present invention has the beneficial effects as follows.

Firstly, according to the present invention, the non-incident samples are down-sampled by a time series clustering mode, and compared with other sampling methods, the samples obtained by clustering can not only fully represent original samples, but also retain the distribution of the original samples to the maximum extent, so that the distribution of the down-sampled samples is highly similar to that of the original samples.

Secondly, according to the present invention, the traffic incidents are detected by a sample pairing mode based on small sample learning, and the sample pairing can not only effectively alleviate the problem of data imbalance, but also greatly enrich sample data, thus training the model more sufficiently.

Thirdly, according to the present invention, the twin network architecture is adopted, and compared with a single network architecture, the twin network architecture is easier to distinguish feature expressions of different types of samples in a high-dimensional space, thus having the advantage of high-accuracy incident detection.

DETAILED DESCRIPTION OF PREFERRED EMBODIMENTS

The technical solutions of the present invention are described clearly in detail hereinafter with reference to the drawings and specific embodiments.

Embodiment 1

Figure 1:
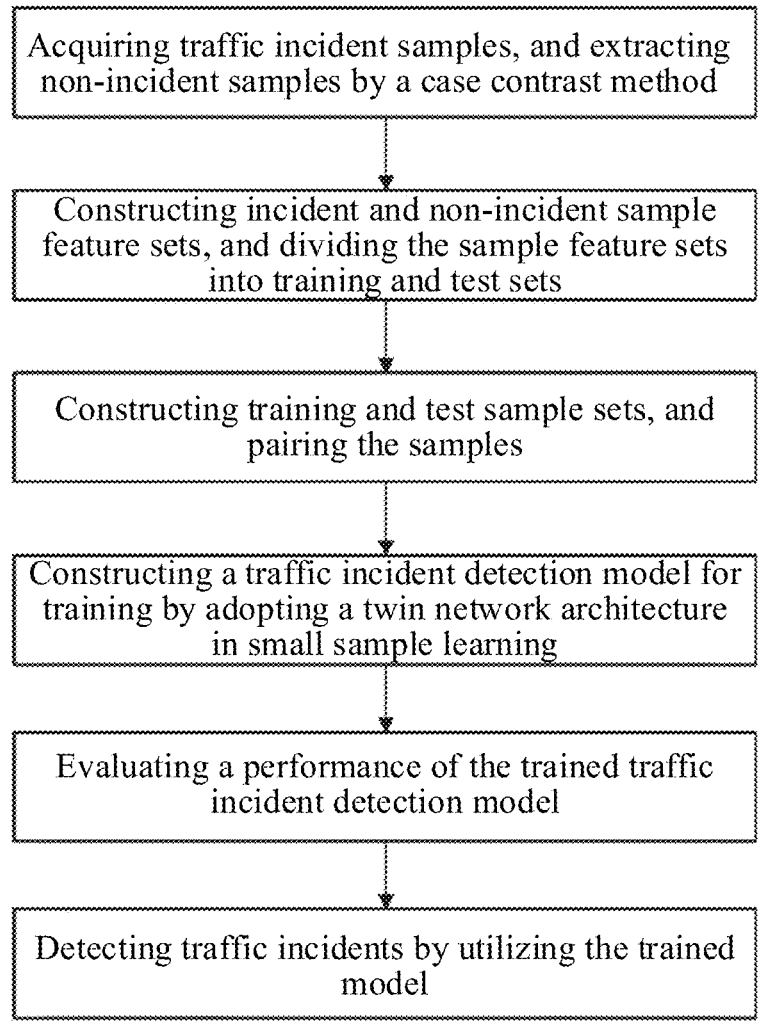
FIG. 1 is a flow chart of a road traffic incident detection method based on small sample learning in an embodiment of the present invention.

As shown in FIG. 1, a road traffic incident detection method based on small sample learning comprises the following steps:

S1: collecting traffic incident samples, and extracting non-incident samples by a case contrast study method to obtain original data;

S2: calculating traffic flow data according to the original data, extracting traffic flow space-time state features to obtain an incident sample feature set ESFS and a non-incident sample feature set NESFS, and respectively dividing the incident sample feature set and the non-incident sample feature set into a training set and a test set to obtain a training sample set $SFS_{train}$ and a test sample set $SFS_{test}$;

S3: pairing samples in the training sample set $SFS_{train}$ to obtain sample pairs, and assigning a label to each sample pair to obtain a training sample pair set $PSP_{train}$;

S4: constructing a traffic incident detection model by adopting a twin network architecture in small sample learning, and training the traffic incident detection model by utilizing the training sample pair set $PSP_{train}$;

S5: pairing samples in the test sample set to obtain a test sample pair set $PSP_{tests}$ and evaluating a performance of the trained traffic incident detection model by using the test sample pair set $PSP_{test}$; and S6: detecting traffic incidents by utilizing the trained traffic incident detection model.

In the above technical solution, traffic incident sample data contain traffic incident occurrence location and time; and the non-incident samples need to meet the following conditions:

a. the non-incident samples and the incident samples come from a same traffic detector, and are collected from a same time period;

b. when an incident occurs on a working day, the non-incident samples are extracted from all other working days in the same month except the day when the incident occurs; and when the incident occurs on a non-working day, the non-incident samples are extracted from all other non-working days in the same month except the day when the incident occurs; and c. time of the extracted non-incident samples is 0.5 hour before occurrence time of any incident sample, or 0.5 hour after end of an incident duration.

In the step S1, detectors corresponding to the incident samples and the non-incident samples are upstream and downstream detectors in the nearest occurrence locations the original data extracted by the detector contain:

a total number N of vehicles passing through the detector within a certain time period T;

a speed v of an $i^{th}$ vehicle at the detector within the certain time period T; and time $t_i$ taken by the $i^{th}$ vehicle to pass through the detector within the certain time period T.

In the step S2, the traffic flow data comprise a flow, a speed and an occupancy, which are calculated by the following methods:

$$\text{flow } q = \frac{N}{T};$$

$$\text{speed } v = \frac{\sum_{i=1}^{N} v_i}{N}; \text{ and}$$

$$\text{occupancy } o = \frac{\sum_{i=1}^{N} t_i}{T}.$$

The traffic flow space-time state features comprise upstream features, which are time series data of upstream flow, speed and occupancy, downstream features, which are time series data of downstream flow, speed and occupancy, and upstream and downstream difference features, which are obtained by calculating differences of upstream and downstream flows, speeds and occupancies of a same time step t according to a formula as follows:

$$f_t^{diff} = f_t^{down} - f_t^{up}$$

wherein, $f_t^{diff}$ is a difference value, and $f_t^{down}$ and $f_t^{up}$ are respectively corresponding downstream and upstream parameter values of the time step t.

Mathematical expression of a single sample is as follows:

$$X = \{x_1, x_2, \ldots, x_t, \ldots, x_N\}, x_t \in R^d$$

wherein, X is a sample, $x_t$ is a feature vector of the time step t, N is a total number of time steps, and d is a number of features in the feature vector $x_t$ of each time step.

In the step S3, the respectively dividing the incident sample feature set and the non-incident sample feature set into the training set and the test set to obtain the training sample set and the test sample set, specifically comprises:

performing standard deviation Z-score standardization processing on the incident sample feature set ESFS and the non-incident sample feature set ESFS by a calculation formula as follows:

$$f'_{i,j} = \frac{f_{i,j} - \mu}{\sigma}$$

wherein, $f_{i,j}$ is $j^{th}$ data of an $i^{th}$ feature dimension, $f_{i,j}'$ is standardized data, μ is a mean value of data of the $i^{th}$ feature dimension of all samples, and σ is a standard deviation of data of the $i^{th}$ feature dimension of all samples; and randomly selecting a % (a value of the a is 70, 80, etc.) of samples from the incident sample feature set as the incident sample training set $ESFS_{train}$ taking the remaining samples as the incident sample test set $ESFS_{test}$, randomly selecting a % of samples from the non-incident sample feature set as the non-incident sample training set $NESFS_{train}$, and taking the remaining samples as the non-incident sample test set $NESF-S_{test}$; and down-sampling the non-incident sample training set $NESFS_{train}$ to obtain a down-sampled non-incident sample training set $USNES_{train}$, combining the incident sample training set $ESFS_{train}$, and the down-sampled non-incident sample training set $USNES_{train}$ into the training sample set $SFS_{train}$ ($SFS_{train}=USNES_{train}+ESFS_{train}$), and combining the incident sample test set $ESFS_{test}$ and the non-incident sample test set $NESFS_{test}$ into the test sample set $SFS_{test}$ ($SFS_{test}=NESFS_{test}+ESFS_{test}$).

The down-sampling the non-incident sample training set $NESFS_{train}$, specifically comprises:

clustering the non-incident sample training set $NESFS_{train}$ by a K-shape time series clustering method to obtain a cluster set CS, wherein the cluster set CS comprises $n_{cs}$ clusters, and according to a number $N_{ET}$ of samples in the incident sample training set $ESFS_{train}$, randomly selecting $N_{ET}/n_{cs}$ representative samples from each cluster to obtain the down-sampled non-incident sample training set $USNES_{train}$.

In the step S3, the pairing the samples in the training sample set $SFS_{train}$ to obtain the sample pairs, and assigning the label to each sample pair, specifically comprises:

pairing each sample in the training sample set $SFS_{train}$ with all other samples in the training sample set except the sample to obtain a training sample pair set $PSP_{train}$. A labeling rule after sample pairing is as follows:

$$\{SFS_1, SFS_2\} = \begin{cases} 1, \text{ if } \{SFS_1 \in USNES_{train} \text{ and } SFS_2 \in USNES_{train}) \\ \quad \text{ or } (SFS_1 \in ESFS_{train} \text{ and } SFS_2 \in ESFS_{train}) \\ 0, \text{ if } \{SFS_1 \in ESFS_{train} \text{ and } SFS_2 \in USNES_{train}) \\ \quad \text{ or } (SFS_1 \in USNES_{train} \text{ and } SFS_2 \in ESFS_{train}) \end{cases}$$

wherein, $\{SFS_1, SFS_2\}$ is a paired sample pair, $\{SFS_1, SFS_2\} \in PSP_{train}$, and $SFS_i (i \in 1,2)$ is an $i^{th}$ sample participating in pairing. The labeling rule is as follows: when two samples in the sample pair both belong to the incident samples or the non-incident samples, a positive label 1 is assigned; and when two samples in the sample pair respectively belong to the incident sample and the non-incident sample, a negative label 0 is assigned.

Figure 2:
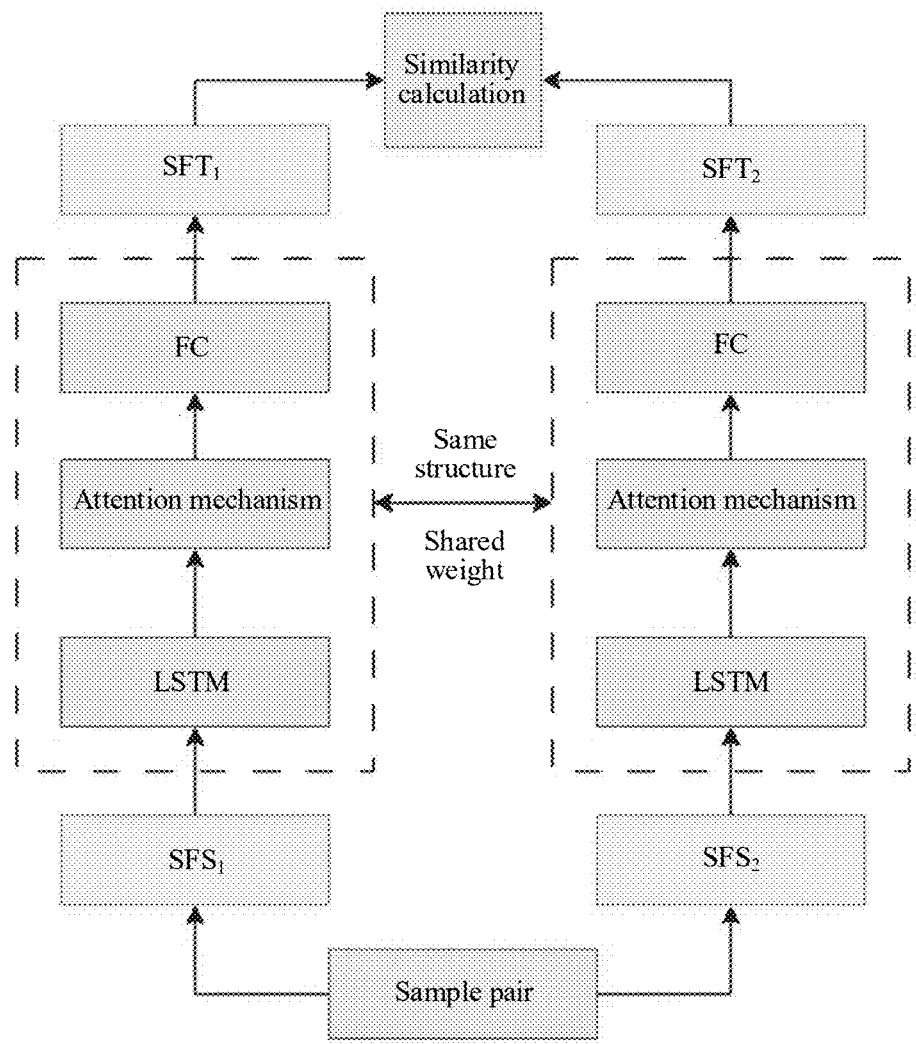
FIG. 2 is an architecture diagram of a model adopted in the embodiment of the present invention.

In the step S4, a structure of the two sub-networks in the twin network architecture is long and short-term memory network LSTM—attention mechanism—full connection layer FC, and the two sub-networks share same weight and parameters. A model architecture adopted is as shown in FIG. 2. The sample features are embedded by the LSTM first, the LSTM outputs a hidden state vector $h_t$ and a memory unit $c_t$ of each time step t, and the sample features are calculated by formulas as follows:

$i_t=\sigma(W_i x_t+U_i h_{t-1}+b_i)$ $f_t=\sigma(W_f x_t+U_f h_{t-1}+b_f)$ $o_t=\sigma(W_o x_t+U_o h_{t-1}+b_o)$ $g_t=\tanh(W_g x_t+U_g h_{t-1}+b_g)$ $c_t=f_t c_{t-1}+i_t g_t$ $h_t=o_t \tanh(c_t)$ wherein, $i_t$, $f_t$ and $o_t$ are respectively output vectors of an input gate, a forgetting gate and an output gate of the time step t, $g_t$ is a candidate state, $h_{t-1}$ refers to a hidden state vector of a time step t−1, σ is a Sigmoid activation function, $W_i$, $W_f$, $W_o$, $W_g$, $U_i$, $U_f$, $U_o$ and $U_g$ are weight matrices, and $b_i$, $b_f$, $b_o$ and $b_g$ are bias vectors.

The attention mechanism is used to calculate an importance score of the hidden state $h_t$ of each time step, and then a final vector is obtained by weighted summation, which is calculated by formulas as follows:

$$e_t = v^T \tanh(W_h h_t + b_h)$$

$$\alpha_t = \frac{\exp(e_t)}{\sum_{k=1}^{N} \exp(e_k)}$$

$$z = \sum_{t=1}^{N} \alpha_t h_t$$

wherein, v is a weight vector, $W_h$ and $b_h$ are a weight matrix and a bias vector, t and k represent time steps, $e_t$ and $e_k$ are respectively attention scores of the time steps t and k, $a_t$ is an attention weight of the time step t, N is a total number of time steps, and z is a feature vector.

The final feature vector may be obtained by allowing z to pass through the full connection layer, which is calculated by formula as follows:

$SFT=W_c z+b_c$ wherein, SFT is a feature vector of a single sample output through a sub-network, and $W_c$ and $b_c$ are a weight matrix and a bias vector.

A loss function used in the trained model is a contrast loss function, which is calculated by formula as follows:

$$L = \frac{1}{N} \sum_{k=1}^{N} y_k D_E(SFS_1, SFS_2) + (1 - y_k) \, max[d - D_E(SFS_1, SFS_2), 0]$$

wherein, N is a number of samples, $y_k$ is a label of a sample pair, $D_E(SFS_1, SFS_2)$ is an Euclidean distance between features after model extraction, and d is a fixed parameter, with a value of 2. The purpose is to reduce a distance between features extracted from the same sample through the network, and increase a distance between different samples.

The step S5 specifically comprises: respectively pairing the samples in the test sample set $SFS_{test}$ with the samples in the training sample set $SFS_{train}$ one by one to obtain the test sample pair set $PSP_{test}$; inputting test sample pairs into the trained traffic detection model to obtain high-dimension features of two samples output by the model, and calculating an Euclidean distance between two high-dimension features; and for a minimum distance output after pairing a certain sample in the test sample set with all samples in the training sample set, classifying the test sample into the same category as the paired sample of the minimum distance, determining whether the test sample is the incident sample according to category judgment, and then evaluating the performance of the traffic incident detection model.

Embodiment 2

A road traffic incident detection system based on small sample learning comprises:

a data collecting module configured for collecting traffic incident samples, and extracting non-incident samples by a case contrast study method to obtain original data;

a feature collecting module configured for calculating traffic flow data according to the original data, extracting traffic flow space-time state features to obtain an incident sample feature set and a non-incident sample feature set, and respectively dividing the incident sample feature set and the non-incident sample feature set into a training set and a test set to obtain a training sample set and a test sample set;
a training sample pairing module configured for pairing samples in the training sample set to obtain sample pairs, and assigning a label to each sample pair to obtain a training sample pair set;
a model training module configured for constructing and training a traffic incident detection model by adopting a twin network architecture in small sample learning, and training the model by utilizing the training sample pair set;
a performance evaluating module configured for pairing samples in the test sample set to obtain a test sample pair set, and evaluating a performance of the trained traffic incident detection model by using the test sample pair set; and
an incident detecting module configured for detecting traffic incidents by utilizing the trained traffic incident detection model.

Embodiment 3

Taking incident information within 28 days (from Sep. 1, 2021 to Sep. 28, 2021) in records of a certain expressway, traffic incidents are detected by a method as follows:

1. Construction of Incident and Non-Incident Sample Feature Sets

Figure 3:
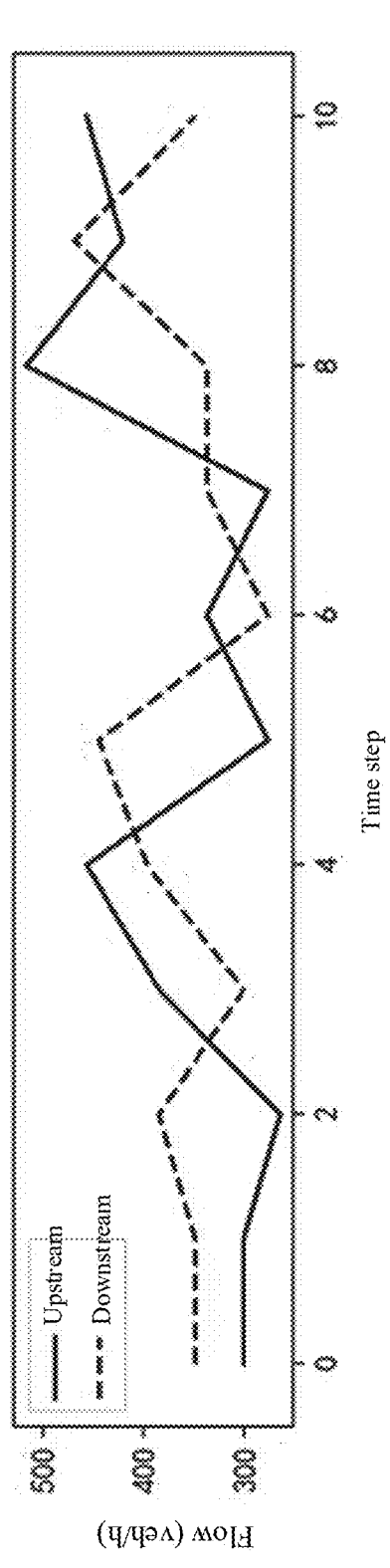
FIG. 3 is a schematic diagram of upstream and downstream flow time series data of a certain sample in the embodiment of the present invention.
Figure 4:
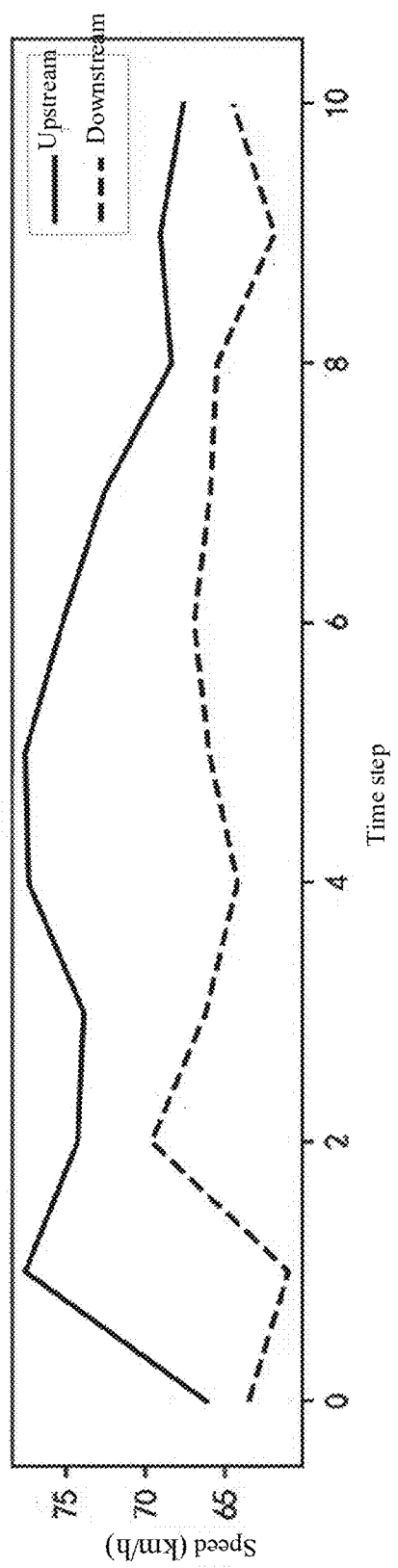
FIG. 4 is a schematic diagram of upstream and downstream speed time series data of the certain sample in the embodiment of the present invention.
Figure 5:
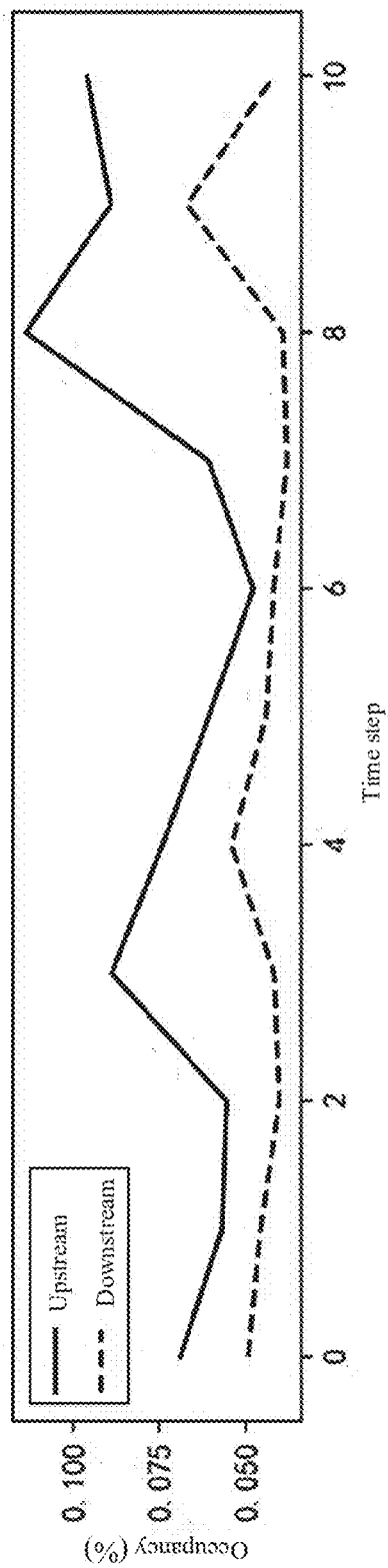
FIG. 5 is a schematic diagram of upstream and downstream occupancy time series data of the certain sample in the embodiment of the present invention.
Figure 6:
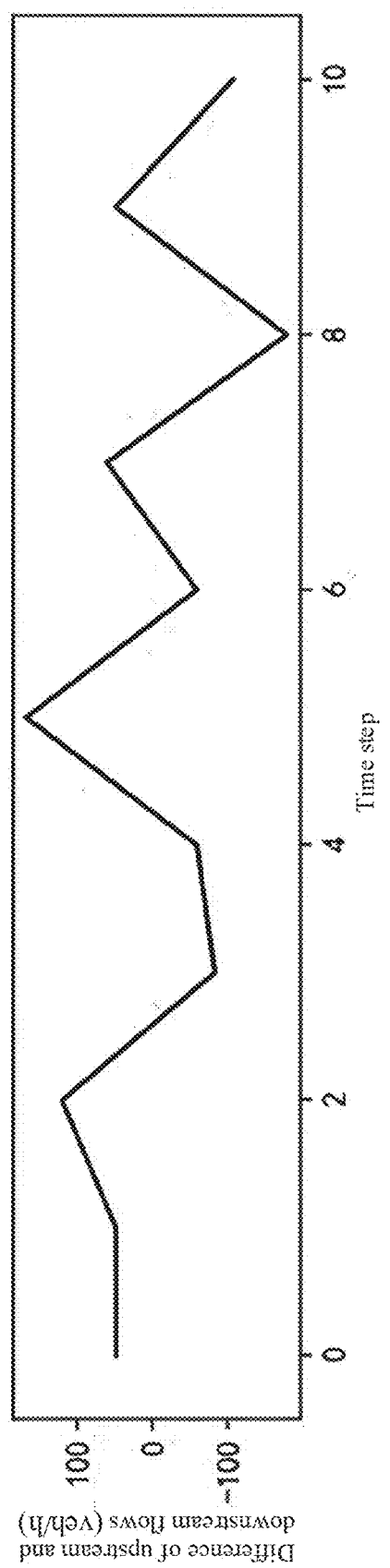
FIG. 6 is a schematic diagram of upstream and downstream flow difference time series data of the certain sample in the embodiment of the present invention.
Figure 7:
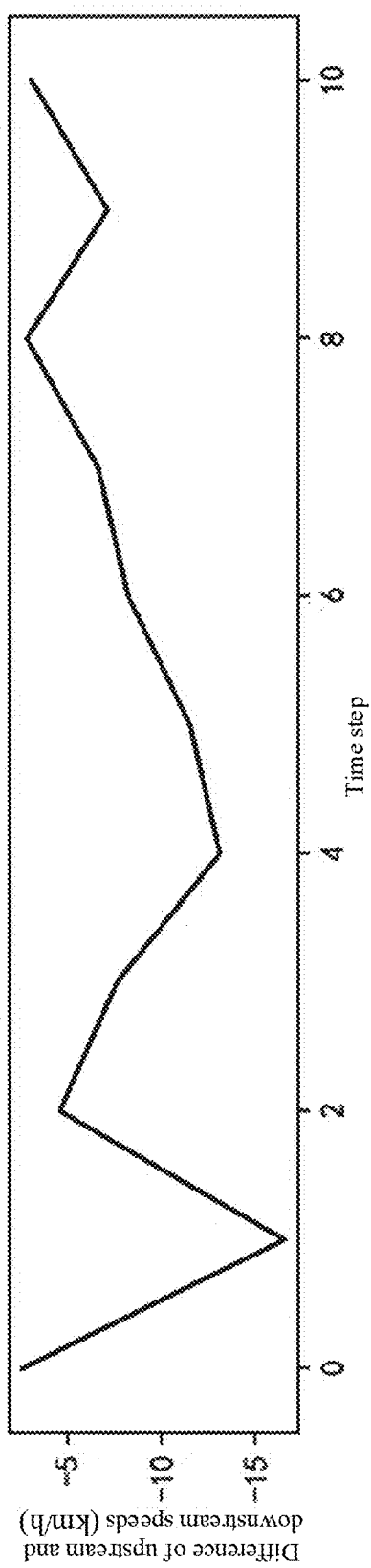
FIG. 7 is a schematic diagram of upstream and downstream speed difference time series data of the certain sample in the embodiment of the present invention.
Figure 8:
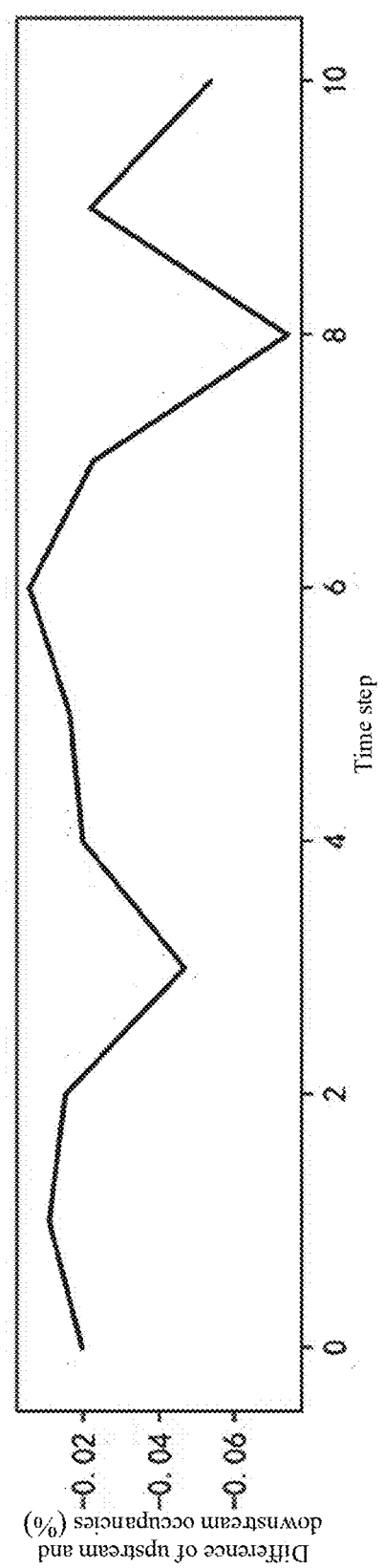
FIG. 8 is a schematic diagram of upstream and downstream occupancy difference time series data of the certain sample in the embodiment of the present invention.

A number of incident samples recorded within 28 days is 211, and a number of non-incident samples obtained by a case control method is 3267. A minimum time period T recorded by a detector is 30 seconds. Referring to existing studies, data collected in 5 minutes before occurrence of traffic incident and in first 30 seconds after occurrence of traffic incident are selected, traffic flow data are calculated from original data, and traffic flow space-time state features are extracted, so as to construct incident and non-incident feature sets. Schematic diagrams of upstream and downstream flows, speeds and occupancies of a certain sample are shown in FIG. 3, FIG. 4 and FIG. 5, and schematic diagrams of differences of upstream and downstream flows, speeds and occupancies are shown in FIG. 6, FIG. 7 and FIG. 8.

2. Construction of Training and Test Sample Pairs

80% of samples are randomly selected from incident and non-incident samples respectively as a training set, the remaining 20% of samples are used as a test set, and then a non-incident sample training set is down-sampled. Numbers of samples before and after down-sampling are shown in the following table:

|  | Before down-sampling | | After down-sampling | |
| --- | --- | --- | --- | --- |
| Number of samples | Training set | Test set | Training set | Test set |
| Non-incident sample | 2614 | 653 | 168 | 653 |
| Incident sample | 168 | 43 | 168 | 43 |

The down-sampled non-incident sample training set is combined with an incident sample training set to obtain a training sample set, and samples in the training sample set are paired. A ratio of a number of paired samples to categories of samples before down-sampling and before pairing is shown in the following table:

| Stage | Category of sample | Number | Ratio | Total number |
| --- | --- | --- | --- | --- |
| Before down-sampling | Non-incident sample | 2614 | 15.56:1 | 2782 |
|  | Incident sample | 168 | | |
| After down-sampling and before pairing | Non-incident sample | 168 | 1:1 | 336 |
|  | Incident sample | 168 | | |
| After pairing | Identical sample pair | 28056 | 0.994:1 | 56280 |
|  | Different sample pair | 28224 | | |

After sample pairing, a total number and a proportion of samples are both improved, which not only avoids an influence caused by imbalance of a number of categories, but also enables a model to have sufficient data for training. By analyzing in combination with a number of samples before down-sampling, if the training sets of the non-incident samples and the incident samples are directly paired, numbers of identical sample pairs and different sample pairs are about 3,429,000 and 439,000 respectively, which are extremely large, a risk of over-fitting during training is high, and the number of categories is still unbalanced, which further indicates the necessity of down-sampling the non-incident sample training set to select representative samples.

3. Model Training and Performance Evaluation

Figure 9:
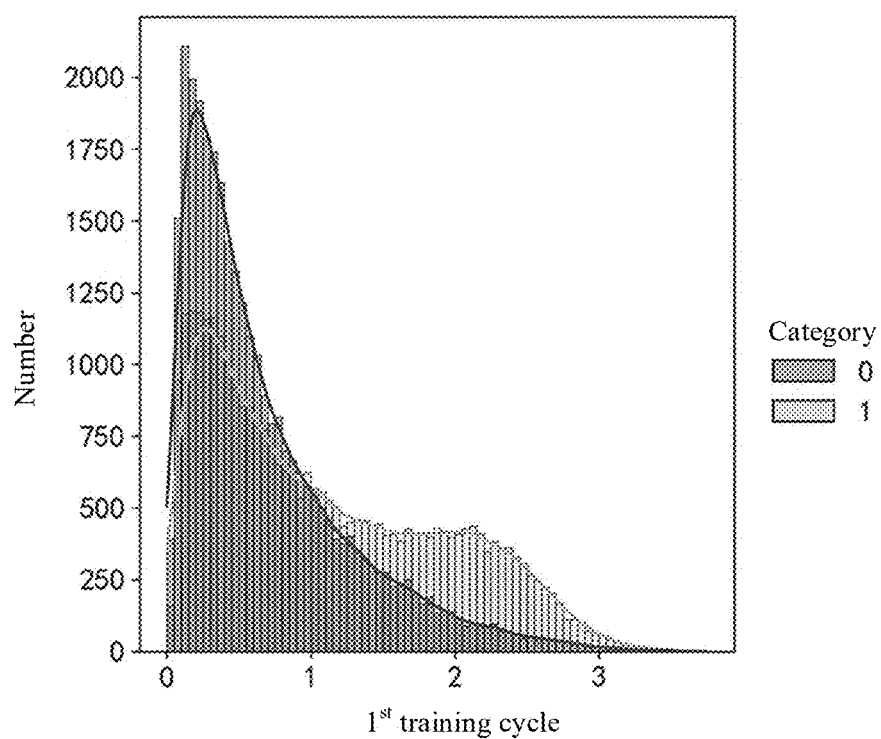
FIG. 9 is a distribution diagram of a distance between features of sample pairs in a $1^{st}$ cycle of model training in the embodiment of the present invention.
Figure 10:
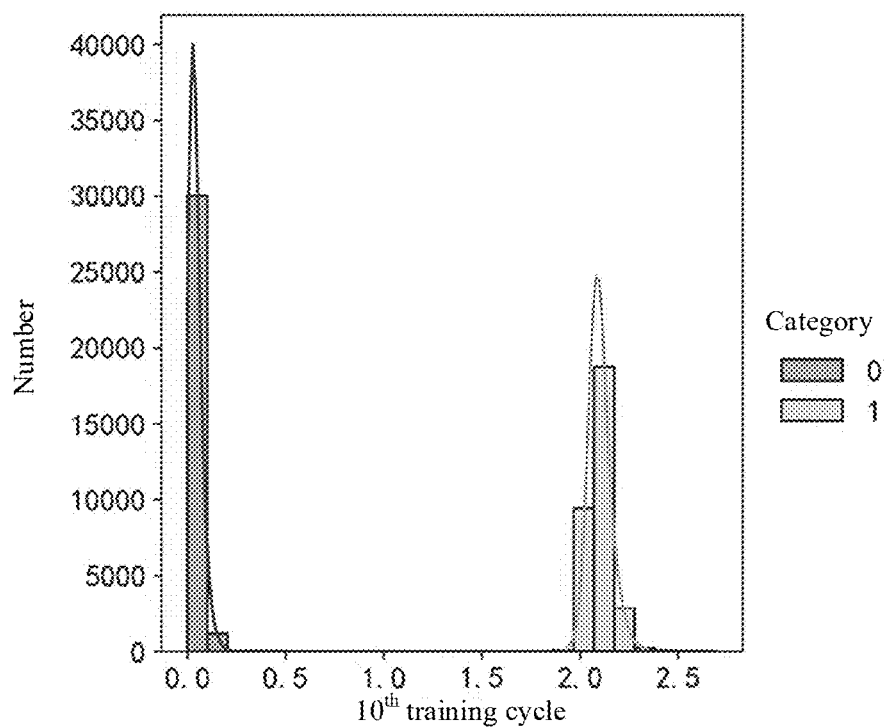
FIG. 10 is a distribution diagram of a distance between features of sample pairs in a $10^{st}$ cycle of model training in the embodiment of the present invention.

The model is trained by using the training sample pairs. Distribution diagrams of distances between features of sample pairs in a $1^{st}$ cycle and a $10^{th}$ cycle during model training are shown in FIG. 9 and FIG. 10.

The performance of the model is evaluated by using the test sample pairs. Confusion matrices of evaluation results of the model are shown in the following table:

| | | Identified category of model | |
| --- | --- | --- | --- |
| Number of samples | | Incident sample | Non-incident sample |
| True category of sample | Incident sample | 37 | 6 |
|  | Non-incident sample | 8 | 645 |

The model has an acquisition accuracy rate of 82.22%, a recall rate of 86.05%, and an F1 score of 0.841, so that the traffic incidents can be effectively detected.

Those skilled in the art shall understand that the embodiments of the present invention may be provided as methods, systems or computer program products. Therefore, the present invention may take the form of complete hardware embodiment, complete software embodiment or software-hardware combined embodiment. Moreover, the present invention may take the form of computer program product implemented on one or more computer usable storage media (including, but being not limited to, a disk memory, a CD-ROM, an optical memory, etc.) in which computer usable program codes are included.

The present invention is described with reference to the flow charts and/or block diagrams of the methods, devices (systems), and computer program products according to the embodiments of the present invention. It shall be appreciated that each flow and/or block in the flow charts and/or block diagrams, and combinations of the flows and/or blocks in the flow charts and/or block diagrams may be implemented by computer program instructions. These computer program instructions may be provided to a general purpose computer, a special purpose computer, an embedded processor, or a processor of other programmable data processing device to produce a machine for the instructions executed by the computer or the processor of other programmable data processing device to generate an apparatus for implementing the functions specified in one or more flows of the flow chart and/or in one or more blocks of the block diagram.

These computer program instructions may also be provided to a computer readable memory that can guide the computer or other programmable data processing apparatus to work in a given manner, so that the instructions stored in the computer readable memory generate a product including an instruction device that implements the functions specified in one or more flows of the flow chart and/or in one or more blocks of the block diagram.

These computer program instructions may also be loaded to a computer, or other programmable data processing apparatus, so that a series of operating steps are executed on the computer, or other programmable data processing apparatus to produce processing implemented by the computer, so that the instructions executed in the computer or other programmable data processing apparatus provide steps for implementing the functions specified in one or more flows of the flow chart and/or in one or more blocks of the block diagram.

The above are only the preferred embodiments of the present invention. Although the present invention has been disclosed above with reference to the preferred embodiments, the preferred embodiments are not used to limit the present invention. Those skilled in the art can make many possible changes and modifications to the technical solution of the present invention by using the methods and technical contents disclosed above, or modify them into equivalent embodiments with equivalent changes, without departing from the scope of the technical solution of the present invention. Therefore, any simple modifications, equivalent changes and modifications made to the above embodiments according to the technical essence of the present invention without departing from the contents of the technical solution of the present invention still fall within the scope of protection of the technical solution of the present invention.

We claim:

1. A road traffic incident detection method based on small sample learning, comprising the following steps:
   S1: collecting traffic incident samples, and extracting non-incident samples by a case contrast study method to obtain original data;
   S2: calculating traffic flow data according to the original data, extracting traffic flow space-time state features to obtain an incident sample feature set and a non-incident sample feature set, and respectively dividing the incident sample feature set and the non-incident sample feature set into a training set and a test set to obtain a training sample set and a test sample set;
   S3: pairing samples in the training sample set to obtain sample pairs, and assigning a label to each sample pair to obtain a training sample pair set; specifically, pairing each sample in the training sample set with all other samples in the training sample set except the sample to obtain several sample pairs; when two samples in the sample pair both belong to the incident samples or the non-incident samples, assigning a positive label; and when two samples in the sample pair respectively belong to the incident sample and the non-incident sample, assigning a negative label;
   S4: constructing a traffic incident detection model by adopting a twin network architecture in small sample learning, and training the traffic incident detection model by utilizing the training sample pair set;
   S5: pairing samples in the test sample set to obtain a test sample pair set, and evaluating a performance of the trained traffic incident detection model by using the test sample pair set; specifically, respectively pairing the samples in the test sample set with the samples in the training sample set one by one to obtain the test sample pair set; and inputting test sample pairs into the trained traffic detection model, outputting a distance between two samples by the model, and for a minimum distance output after pairing a certain sample in the test sample set with all samples in the training sample set, classifying the test sample into the same category as the paired sample of the minimum distance, and then evaluating the performance of the traffic incident detection model; and
   S6: detecting traffic incidents by utilizing the trained traffic incident detection model.

2. The road traffic incident detection method based on small sample learning according to claim 1, wherein traffic incident sample data contain traffic incident occurrence location and time; and the non-incident samples need to meet the following conditions:
   a. the non-incident samples and the incident samples come from a same traffic detector, and are collected from a same time period;
   b. when an incident occurs on a working day, the non-incident samples are extracted from all other working days in the same month except the day when the incident occurs; and when the incident occurs on a non-working day, the non-incident samples are extracted from all other non-working days in the same month except the day when the incident occurs; and
   c. time of the extracted non-incident samples is 0.5 hour before occurrence time of any incident sample, or 0.5 hour after end of an incident duration.

3. The road traffic incident detection method based on small sample learning according to claim 1, wherein, in the step S1, detectors corresponding to the incident samples and the non-incident samples are upstream and downstream detectors in the nearest occurrence locations, and the original data extracted by the detector contain:
   a total number N of vehicles passing through the detector within a certain time period T;
   a speed of each vehicle at the detector within the certain time period T; and
   time taken by each vehicle to pass through the detector within the certain time period T.

4. The road traffic incident detection method based on small sample learning according to claim 1, wherein, in the step S3, the respectively dividing the incident sample feature set and the non-incident sample feature set into the training set and the test set to obtain the training sample set and the test sample set, specifically comprises:
   performing standard deviation Z-score standardization processing on the incident sample feature set and the non-incident sample feature set, randomly selecting a certain proportion of samples from the incident sample feature set as the incident sample training set, taking the remaining samples as the incident sample test set, randomly selecting the same proportion of samples from the non-incident sample feature set as the non-incident sample training set, and taking the remaining samples as the non-incident sample test set; and down-sampling the non-incident sample training set, combining the incident sample training set and the down-sampled non-incident sample training set into the training sample set, and combining the incident sample test set and the non-incident sample test set into the test sample set.

5. The road traffic incident detection method based on small sample learning according to claim 4, wherein the down-sampling the non-incident sample training set, specifically comprises:
   clustering the non-incident sample training set by a K-shape time series clustering method to obtain clusters, and according to a number of samples in the incident sample training set, randomly selecting representative samples from each cluster to obtain the down-sampled non-incident sample training set.

6. The road traffic incident detection method based on small sample learning according to claim 1, wherein, in the step S4, a structure of the two sub-networks in the twin network architecture is long and short-term memory network LSTM—attention mechanism—full connection layer FC, and the two sub-networks share same weight and parameters; and a loss function adopted in a trained model is a contrast loss function.

7. A road traffic incident detection system based on small sample learning, comprising:
   a data collecting module configured for collecting traffic incident samples, and extracting non-incident samples by a case contrast study method to obtain original data;
   a feature collecting module configured for calculating traffic flow data according to the original data, extracting traffic flow space-time state features to obtain an incident sample feature set and a non-incident sample feature set, and respectively dividing the incident sample feature set and the non-incident sample feature set into a training set and a test set to obtain a training sample set and a test sample set;
   a training sample pairing module configured for pairing samples in the training sample set to obtain sample pairs, and assigning a label to each sample pair to obtain a training sample pair set; specifically, pairing each sample in the training sample set with all other samples in the training sample set except the sample to obtain several sample pairs; when two samples in the sample pair both belong to the incident samples or the non-incident samples, assigning a positive label; and when two samples in the sample pair respectively belong to the incident sample and the non-incident sample, assigning a negative label;
   a model training module configured for constructing and training a traffic incident detection model by adopting a twin network architecture in small sample learning, and training the model by utilizing the training sample pair set;
   a performance evaluating module configured for pairing samples in the test sample set to obtain a test sample pair set, and evaluating a performance of the trained traffic incident detection model by using the test sample pair set; specifically, respectively pairing the samples in the test sample set with the samples in the training sample set one by one to obtain the test sample pair set; and inputting test sample pairs into the trained traffic detection model, outputting a distance between two samples by the model, and for a minimum distance output after pairing a certain sample in the test sample set with all samples in the training sample set, classifying the test sample into the same category as the paired sample of the minimum distance, and then evaluating the performance of the traffic incident detection model; and
   an incident detecting module configured for detecting traffic incidents by utilizing the trained traffic incident detection model.

8. A computer device, wherein the computer device comprises:
   one or more processors; and
   a memory for storing one or more programs;
   wherein, when the one or more programs are executed by the one or more processors, the one or more processors implement the road traffic incident detection method based on small sample learning according to claim 1.

* * * * *